United States Patent
Noritou

(10) Patent No.: US 7,513,169 B2
(45) Date of Patent: Apr. 7, 2009

(54) ROTATIONAL POSITION MEASURING DEVICE

(75) Inventor: Yasuji Noritou, Sakai (JP)

(73) Assignee: JTEKT Corporation, Osaka-shi (JP)

( * ) Notice: Subject to any disclaimer, the term of this patent is extended or adjusted under 35 U.S.C. 154(b) by 19 days.

(21) Appl. No.: 11/790,626

(22) Filed: Apr. 26, 2007

(65) Prior Publication Data
US 2007/0251332 A1 Nov. 1, 2007

(30) Foreign Application Priority Data
Apr. 27, 2006 (JP) ............................. 2006-123594

(51) Int. Cl.
G01L 3/02 (2006.01)
(52) U.S. Cl. ................................. 73/862.326
(58) Field of Classification Search .............................. 73/862.325–862.339
See application file for complete search history.

(56) References Cited

U.S. PATENT DOCUMENTS 5,677,686 A * 10/1997 Kachi et al. ..................... 341/8
7,298,109 B2 * 11/2007 Sakamaki et al. ........... 318/489
2004/0107781 A1 * 6/2004 Asaumi et al. ......... 73/862.333

FOREIGN PATENT DOCUMENTS

JP 6-147922 A 5/1994

* cited by examiner

Primary Examiner—Max Noori
(74) Attorney, Agent, or Firm—Birch, Stewart, Kolasch & Birch, LLP

(57) ABSTRACT

A rotational position measuring device for measuring a rotational position of a rotating shaft includes generating means for generating a sine wave signal and a cosine wave signal according to the rotational position of the rotating shaft; successive calculating means for successively calculating a sum of each square of the sine wave signal and the cosine wave signal generated by the generating means; change calculating means for calculating a change in the sums calculated by the successive calculating means; determining means for determining whether or not the change calculated by the change calculating means exceeds a predetermined value; and means for outputting a rotational position signal or an angular signal of the rotating shaft based on the sine wave signal and the cosine wave signal; wherein an abnormality signal is outputted when the determining means determines that the calculated change exceeds the predetermined value.

6 Claims, 2 Drawing Sheets

ROTATIONAL POSITION MEASURING DEVICE

CROSS-REFERENCE TO RELATED APPLICATIONS

This Nonprovisional application claims priority under 35 U.S.C. §119(a) on Patent Application No. 2006-123594 filed in Japan on Apr. 27, 2006, the entire contents of which are hereby incorporated by reference.

BACKGROUND

1. Technical Field

The present invention relates to a rotational position measuring device such as a resolver for measuring the rotational position or angle based on a sine wave signal and a cosine wave signal generated according to the rotational position of a rotating shaft.

2. Description of Related Art

The resolver or the rotational position measuring device of an amplitude modulation type is used in, e.g. the detection of a rotational position of a rotor of a brushless motor, and is often used by being attached to a motor passing shaft. The principle of the resolver is substantially the same as the principle of a transformer, and the resolver is configured by a primary side coil (rotor) and two secondary side coils (stator) spaced apart by 90 degrees from each other.

When an AC voltage is applied to the primary side coil, voltages are also generated at the two secondary side coils, where the amplitudes of respective voltages outputted to the secondary side coils are $V \sin \theta$ and $V \cos \theta$ ($V$ is constant), $\theta$ being a rotor angle, and the rotor angle $\theta$ can be obtained based on $V \sin \theta$ and $V \cos \theta$.

In the resolver, the relational expression $$(V\sin \theta)^2 + (V\cos \theta)^2 = V^2 \text{ (substantially constant)}$$

is always satisfied for the output signals $V \sin \theta$ and $V \cos \theta$. Generally, the failure determination is made based on whether or not the right-hand side of the expression is within a defined range as in a displacement measuring device disclosed in Japanese Patent Application Laid-Open No. 06-147922 (1994).

SUMMARY

However, since the transformation ratio (output amplitude) of the resolver has temperature characteristics, when used in a wide temperature range, the failure determining value must take a large value greater than or equal to a characteristic change by the assumed usage temperature in order to avoid erroneous detection by the temperature change, and failure in which the change in output value is very small such as layer short of the coil may not be detected.

In view of the above, it is an object to provide a rotational position measuring device capable of detecting even the failure in which the change in the output value is very small.

A rotational position measuring device according to a first aspect is a rotational position measuring device for measuring a rotational position of a rotating shaft comprising: generating means for generating a sine wave signal and a cosine wave signal according to the rotational position of the rotating shaft; successive calculating means for successively calculating a sum of each square of the sine wave signal and the cosine wave signal generated by the generating means; change calculating means for calculating a change in the sums calculated by the successive calculating means; determining means for determining whether or not the change calculated by the change calculating means exceeds a predetermined value; and means for outputting a rotational position signal or an angular signal of the rotating shaft based on the sine wave signal and the cosine wave signal; wherein an abnormality signal is outputted when the determining means determines that the calculated change exceeds the predetermined value.

A rotational position measuring device according to a second aspect is characterized in that the change calculating means includes moving average calculating means for calculating a moving average of a predetermined number of the sums, and difference calculating means for calculating a difference between the moving average calculated by the moving average calculating means and the latest sum calculated by the successive calculating means; wherein the difference calculated by the difference calculating means is the change.

A rotational position measuring device according to a third aspect is characterized in that an abnormality signal is outputted when the determining means determines that the change exceeds the predetermined value continuously over a predetermined number of times.

According to the rotational position measuring device according to the first aspect, a sum of each square of the sine wave signal and the cosine wave signal is successively calculated, a change in the successively calculated sums is calculated, determination is made on whether or not the calculated change exceeds a predetermined value, and an abnormality signal is outputted when determined as exceeding the predetermined value, and thus the rotational position measuring device capable of detecting a failure in which the change in output value is very small is realized.

According to the rotational position measuring device according to the second aspect, the change calculating means calculates a moving average of a predetermined number of sums of each square of the sine wave signal and the cosine wave signal, and the difference between the calculated moving average and the latest calculated sum is calculated, and the calculated difference is assumed as the change, and thus the rotational position measuring device capable of detecting a failure in which the change in output value is very small is realized.

According to the rotational position measuring device according to the third aspect, an abnormality signal is outputted when determined that the change exceeds the predetermined value continuously over a predetermined number of times, and thus the rotational position measuring device capable of preventing erroneous detection due to a sudden noise and of detecting a failure in which the change in output value is very small is realized.

The above and further objects and features will more fully be apparent from the following detailed description with accompanying drawings.

DETAILED DESCRIPTION

The present embodiment will now be described with reference to the drawings.

Figure 1:
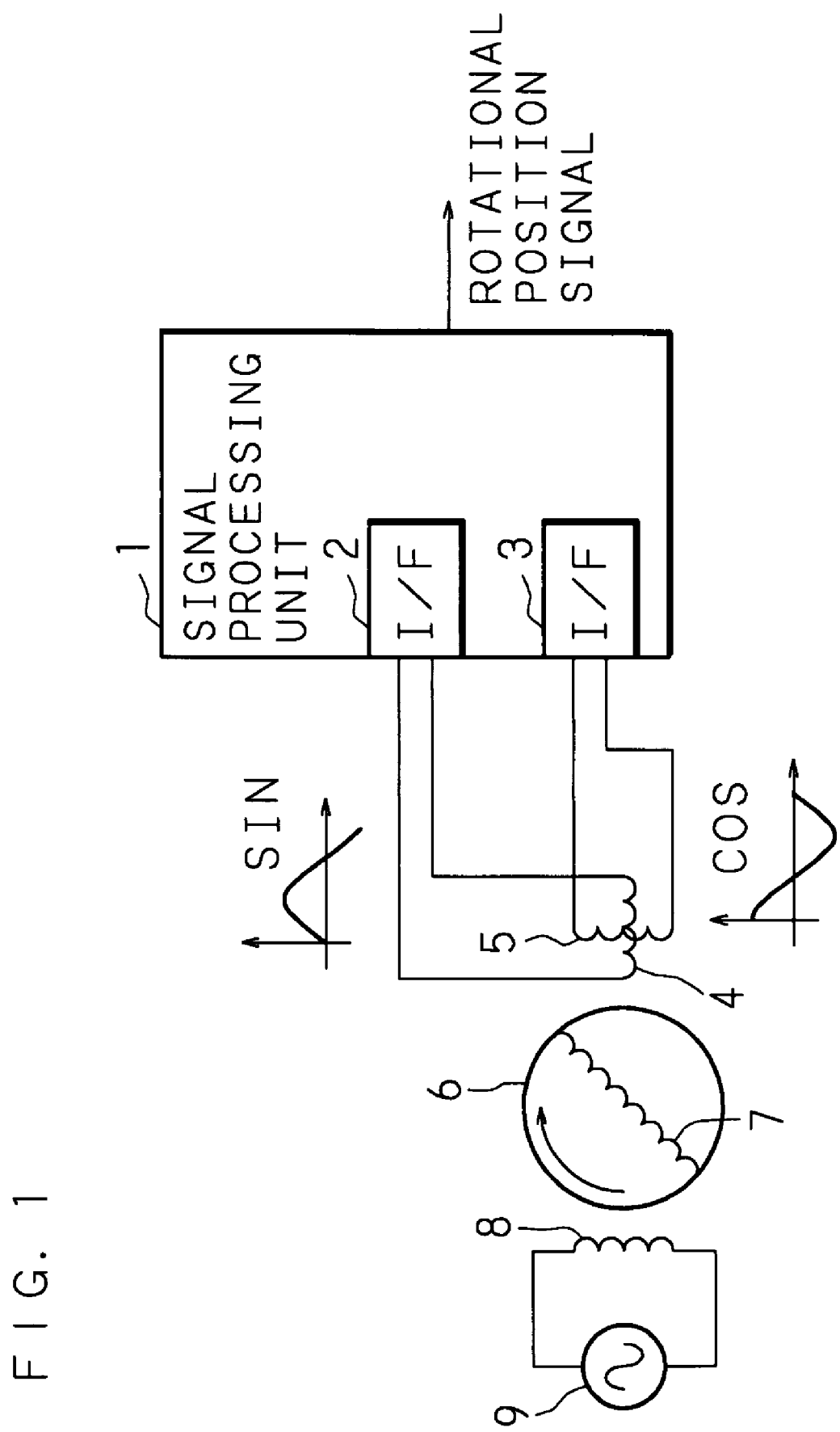
FIG. 1 is a block diagram showing a configuration of a resolver serving as a rotational position measuring device according to the present embodiment.

FIG. 1 is a block diagram showing a configuration of a resolver serving as a rotational position measuring device according to the present embodiment.

In this resolver, a resolver rotor 6 is attached so as to rotate coaxially with a motor passing shaft (not shown), and the resolver rotor 6 includes a primary side coil 7. The primary side coil 7 is magnetically coupled with a primary side coil 8 connected to an AC power supply 9 and fixed so as not to rotate, and is also magnetically coupled with two secondary side coils (stators) 4, 5 spaced apart by 90 degrees from each other and fixed so as not to rotate.

When an AC voltage is applied to the primary side coil 8 by the AC power supply 9, voltages are also generated at the two secondary coils 4, 5, where the amplitudes of respective voltages outputted to the secondary side coils 4, 5 are $V\sin\theta$ and $V\cos\theta$ (V is substantially constant), $\theta$ being an angle of the resolver rotor 6.

The voltages $V\sin\theta$ and $V\cos\theta$ outputted to the secondary side coils 4, 5 are converted into digital signals by interfaces 2, 3, respectively, and read by a signal processing unit 1 (controller), whereby the angle of the resolver rotor 6 is obtained based on the mutual relationship thereof, and outputted as a rotational position signal (angular signal).

Figure 2:
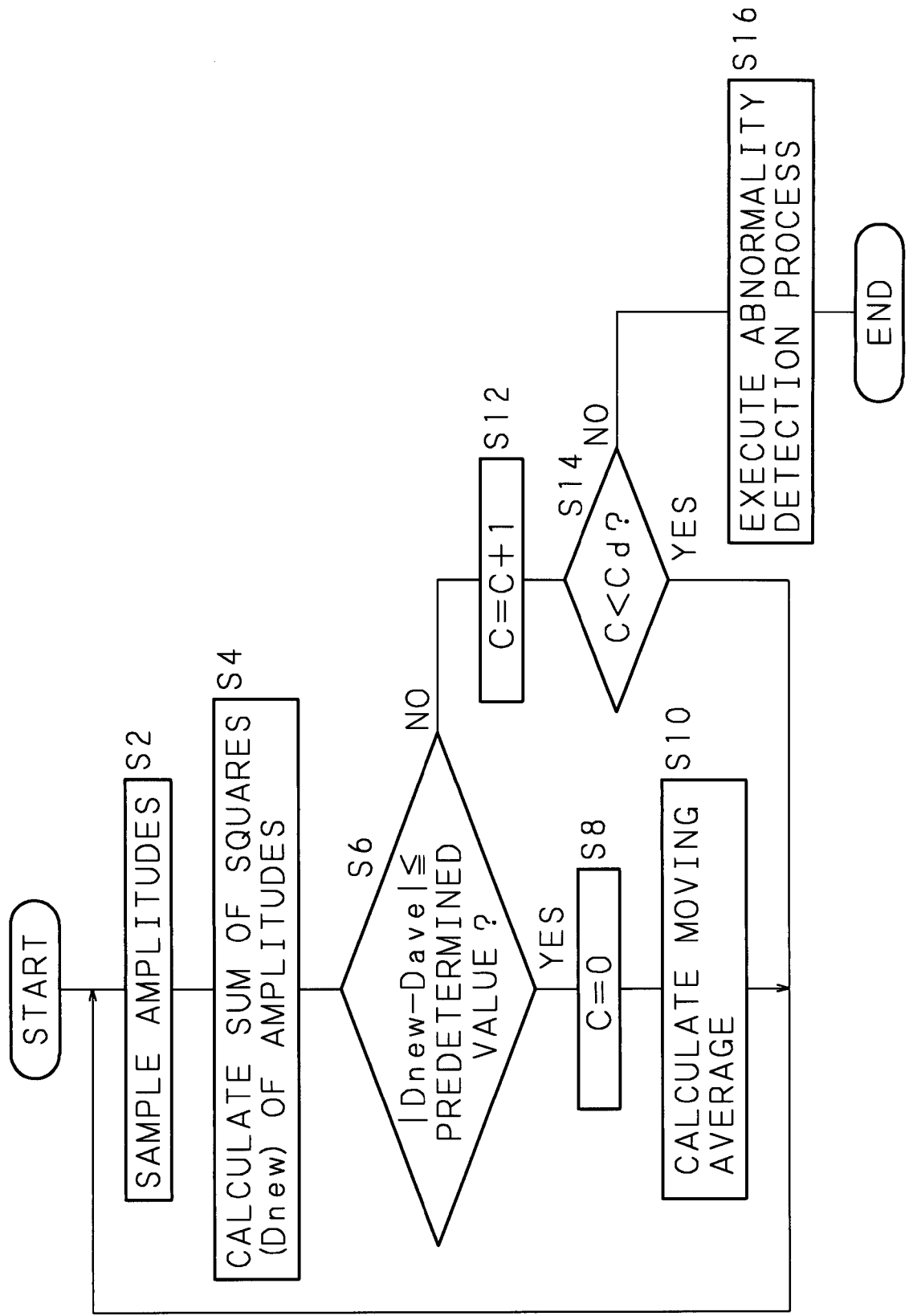
FIG. 2 is a flow chart showing a failure detecting operation of the resolver serving as a rotational position measuring device according to the present embodiment.

The failure detecting operation of the resolver configured as above will now be described with reference to the flowchart of FIG. 2.

In the present embodiment, when the power is turned ON and activated, the parameters are initialized.

The signal processing unit 1 first reads (samples) the amplitudes $V\sin\theta$, $V\cos\theta$ converted into digital signals (S2), and calculates a sum of squares Dnew of the amplitudes sampled this time according to the following equation (S4):

$$(V\sin\theta)^2 + (V\cos\theta)^2 = V^2 = Dnew$$

The signal processing unit 1 then calculates a difference |Dnew−Dave| between the sum of squares Dnew calculated this time (S4) and a moving average Dave of the sums of squares Dnew for, for example, the past ten times, and determines whether or not the calculated difference is less than or equal to a predetermined value (S6).

When the calculated difference is less than or equal to the predetermined value (S6: YES), the signal processing unit 1 sets the count parameter C to 0 (S8), calculates a moving average Dave of the sums of squares Dnew for the past ten times including the sum of squares Dnew for this time (S10), and newly reads (samples) the amplitudes $V\sin\theta$ and $V\cos\theta$ (S2).

When the calculated difference is not less than or equal to the predetermined value (when it is above the predetermined value) (S6: NO), the signal processing unit 1 adds 1 to the count parameter C (S12), and determines whether or not the count parameter C has reached a predetermined number of times Cd (S14).

When the count parameter C has reached the predetermined number of times Cd (S14: NO), the signal processing unit 1 outputs an abnormality signal notifying that an abnormality in the sums of squares of the amplitudes is detected, and terminates the operation after executing an abnormality detection process such as outputting an alarm and stopping the output of the rotational position signal (S16).

When the count parameter C has not reached the predetermined number of times Cd (S14: YES), the signal processing unit 1 newly reads (samples) the amplitudes $V\sin\theta$ and $V\cos\theta$ (S2).

Note that although the present embodiment requires that when the count parameter C has reached the predetermined number of times Cd, the signal processing unit 1 outputs an abnormality signal, this is not limiting. Alternatively, it may be possible to output an abnormality signal when a difference |Dnew−Dave| between a sum of squares Dnew and a moving average Dave exceeds the predetermined value.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A rotational position measuring device for measuring a rotational position of a rotating shaft comprising:
   a generator for generating a sine wave signal and a cosine wave signal according to the rotational position of the rotating shaft; and
   a controller structurally configured to
      successively calculate a sum of each square of the generated sine wave signal and cosine wave signal;
      calculate a change in the calculated sums;
      determine whether or not the calculated change exceeds a predetermined value;
      output an abnormality signal when it is determined that the calculated change exceeds the predetermined value;
      output a rotational position signal or an angular signal of the rotating shaft based on the sine wave signal and the cosine wave signal;
      calculate a moving average of a predetermined number of the sums; and
      calculate a difference between the calculated moving average and the latest calculated sum,
   wherein the calculated difference is the change.

2. The rotational position measuring device according to claim 1, wherein said controller is further structurally configured to output an abnormality signal when it is determined that the change exceeds the predetermined value continuously over a predetermined number of times.

3. The rotational position measuring device according to claim 1, wherein said generator includes a primary side coil attached with the rotating shaft and two secondary side coils magnetically coupled with the primary side coil, voltages are generated at the secondary side coils by applying a voltage to the primary side coil, and amplitudes of the voltages are the sine wave signal and the cosine wave signal respectively.

4. A rotational position measuring device for measuring a rotational position of a rotating shaft comprising:
   generating means for generating a sine wave signal and a cosine wave signal according to the rotational position of the rotating shaft;
   successive calculating means for successively calculating a sum of each square of the sine wave signal and the cosine wave signal generated by the generating means;
   change calculating means for calculating a change in the sums calculated by the successive calculating means;
   determining means for determining whether or not the change calculated by the change calculating means exceeds a predetermined value; and
   means for outputting a rotational position signal or an angular signal of the rotating shaft based on the sine wave signal and the cosine wave signal, and
   wherein an abnormality signal is outputted when the determining means determines that the calculated change exceeds the predetermined value, wherein the change calculating means includes moving average calculating means for calculating a moving average of a predetermined number of the sums, and difference calculating means for calculating a difference between the moving average calculated by the moving average calculating means and the latest sum calculated by the successive calculating means, and wherein the difference calculated by the difference calculating means is the change.

5. The rotational position measuring device according to claim 4, wherein an abnormality signal is outputted when the determining means determines that the change exceeds the predetermined value continuously over a predetermined number of times.

6. The rotational position measuring device according to claim 4, wherein said generating means includes a primary side coil attached with the rotating shaft and two secondary side coils magnetically coupled with the primary side coil, voltages are generated at the secondary side coils by applying a voltage to the primary side coil, and amplitudes of the voltages are the sine wave signal and the cosine wave signal respectively.

* * * * *